United States Statutory Invention Registration [19]

[11] Reg. Number: H912

Piper [43] Published: May 7, 1991

[54] ULTRASONIC LIQUID-IN-LINE DETECTOR FOR TUBES

[75] Inventor: Thomas C. Piper, Idaho Falls, Id.

[73] Assignee: The United States of Amercia as represented by the United States Department of Energy, Washington, D.C.

[21] Appl. No.: 318,874

[22] Filed: Mar. 6, 1989

[51] Int. Cl.[5] ..... G01H 3/12
[52] U.S. Cl. ..... 73/592; 73/599
[58] Field of Search ..... 73/290 V, 592, 599, 73/610, 622, 637; 340/621

[56] References Cited

U.S. PATENT DOCUMENTS

| | | | |
|---|---|---|---|
| 3,744,301 | 7/1973 | Arave | 73/290 V |
| 4,361,041 | 11/1982 | Piper | 73/599 |
| 4,580,444 | 4/1986 | Abts et al. | 73/599 |
| 4,679,430 | 7/1987 | Scott-Kestin et al. | 340/621 |
| 4,685,334 | 8/1987 | Latimer | 73/599 |
| 4,730,493 | 3/1988 | Labaud et al. | 73/599 |

*Primary Examiner*—Thomas H. Tarcza
*Assistant Examiner*—Linda J. Wallace
*Attorney, Agent, or Firm*—Thomas G. Anderson; Paul A. Gottlieb; William R. Moser

[57] ABSTRACT

An apparatus and method for detecting the presence of liquid in pipes or tubes using ultrasonic techniques A first piezoelectric crystal is coupled to the outside of the pipe or tube at the location where liquid in the tube is to be detected. A second piezoelectric crystal is coupled to the outside of the pipe or tube at the same location along the tube but circumferentially displaced from the first crystal by an angle around the pipe or tube of less than 180°. Liquid in the pipe or tube is detected by measuring the attenuation of an ultrasonic signal sent by the first piezoelectric crystal and received by the second piezoelectric crystal.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ULTRASONIC LIQUID-IN-LINE DETECTOR FOR TUBES

CONTRACTUAL ORIGIN OF THE INVENTION

The U.S. Government has rights in this invention pursuant to Contract No. DE-AC07-84ID12435 between the U.S. Department of Energy and Westinghouse Electric Corporation.

BACKGROUND OF THE INVENTION

Many industrial systems in operation today have pipes or tubes designed to contain only air or other gases. Where a back-flow of liquids into such pipes or tubes can create harmful conditions, or where such back-flow might indicate an unwanted diversion of expensive or dangerous liquids, means of detecting liquid would be useful. Also, where the pipes or tubes contain radioactive materials or otherwise hostile environments, it is desirable to detect the presence of a liquid in the pipe or tube without penetrating the pipe or tube. Further difficulties are encountered in detecting liquids especially where the liquid back-flow may contain entrapped gas.

Techniques for sensing fluid presence in a pipe or tube include measuring the conductivity or capacitance of a fluid or measuring the attenuation of gamma, x-ray, visible or infra-red energy beams passed through a fluid. These techniques require costly equipment which is susceptable to damage or misalignment from rough handling. Further, these systems require continuous-wave excitation techniques which are susceptible to deleterious reflection signals.

A previous invention directed at this problem is U.S. Pat. No. 4,361,041, "Non-Intrusive Ultrasonic Liquid-In-Line Detector for Small Diameter Tubes", by Thomas C. Piper, issued Nov. 30, 1982. In that invention, two pairs of transducers are longitudinally displaced along a small pipe having a diameter of approximately 0.25 inches and a wall thickness of 0.035 inches. A tone generator connected to one pair of transducers sends a tone into the pipe via the first pair of transducers. Though suitable for pipes of such small diameter, the invention of '041 is less acceptable for larger diameter pipes because it did not provide a definitive signal with larger pipes. Furthermore, the '041 invention could render ambiquous results where liquid was only partially present in the line such as where there were bubbles or air gaps in the line between the sending and receiving pairs of transducers. A further disadvantage of the '041 invention was that when used with two transducers, the tubes had to be specially flattened to connect the transducers.

It is therefore an object of the present invention to detect the presence of liquid in a tube without penetrating the tube.

Another object of the present invention is to detect the presence of liquid in a tube without using continuous-wave excitation techniques.

An additional object of the invention is to provide an accurate and reliable liquid detection scheme that may be embodied in durable, relatively inexpensive equipment.

It is an additional object of the invention to provide a means for detecting the presence of liquid in a tube without having to modify the tube by drilling or flattening.

It is a further object of this invention to detect the presence of liquid in a tube of diameter larger than approximately 0.5 inch.

It is a still further object of this invention to detect the presence of liquid in a tube at an exact location in the tube.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

A first transducer is coupled to the outside of a tube at the location where liquid in the tube is to be detected. A second transducer is coupled to the outside of the tube at the same location along the tube but circumferentially displaced less than 180° around the tube from the first transducer. The first transducer sends a pulse into the tube which propagates circumferentially in both directions to the second transducer. The pulse is measured by the second transducer but only during the brief interval of time while the pulse from the shorter (less than 180°) path is active and before arrival of the pulse from the longer (greater that 180°) path. An attenuated signal at the second transducer indicates the presence of liquid in the tube.

DETAILED DESCRIPTION OF THE INVENTION

Figure 1:
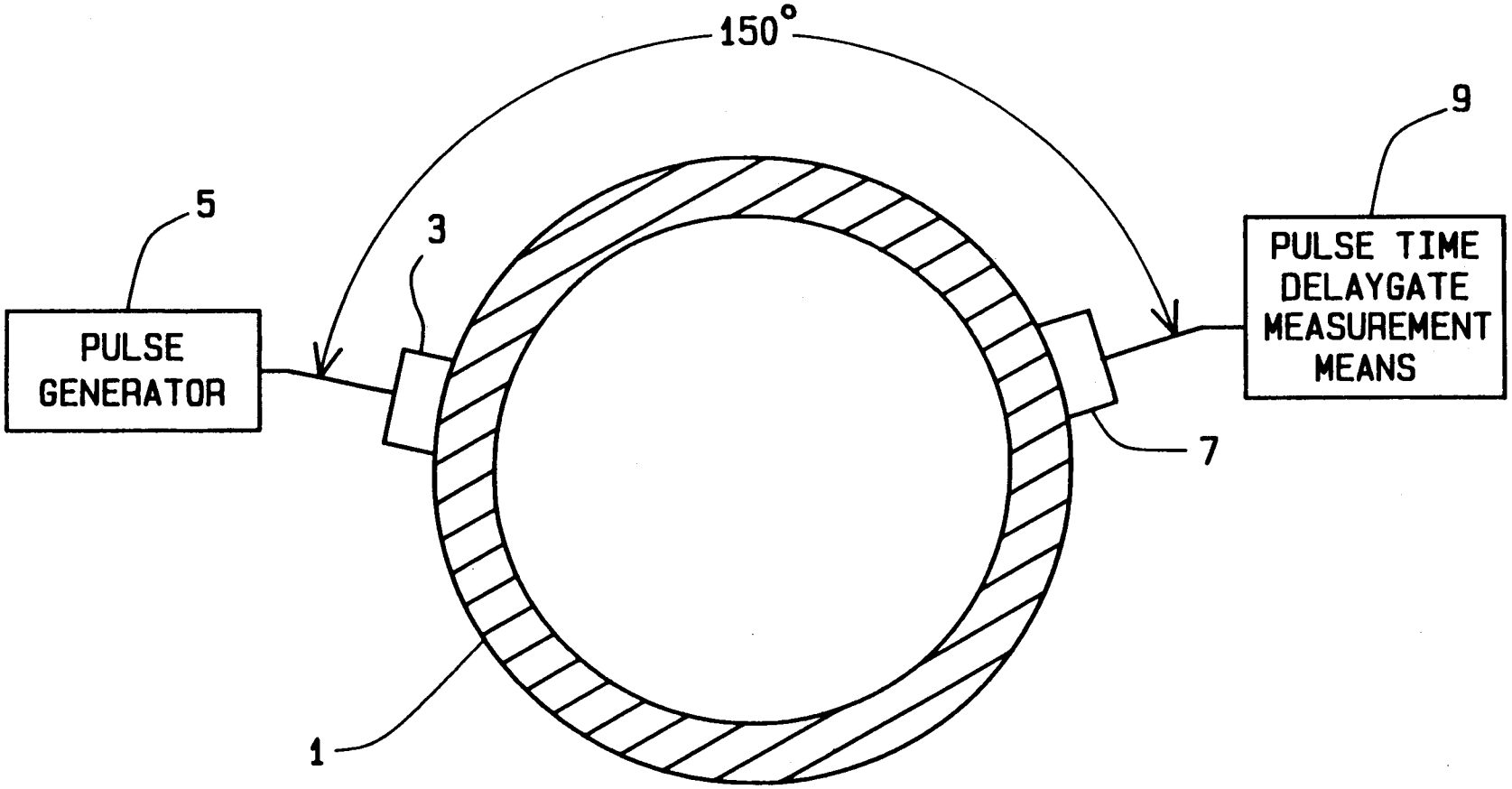
FIG. 1 is a cross-section of a tube with the present invention attached.

Referring to FIG. 1, there is depicted tube 1 in cross-section. Attached to tube 1 is first transducer 3 which is the sending transducer. A pulse generator 5 is connected to first transducer 3. A second transducer 7 is attached to tube 1 in the same cross-sectional plane as first transducer 3, but displaced circumferentially from first transducer 3 by approximately 150°. Second transducer 7 is connected to pulse time delay gate measurement means 9 which is capable of measuring the amplitude of the response of second transducer 7.

In operation, pulse generator 5 sends a pulse into the walls of tube 1 via first transducer 3. The pulse initiates an undulatory wave in the wall of tube 1 with a wave front propagating circumferentially around the tube in both directions from transducer 3. Second transducer 7 first intercepts the wave from the 150° path and then later it intercepts signals from both the 150° and 210° paths. Pulse time delay gate measurement means 9 also contains tunable gating circuitry to select the signal for just the brief interval while only the 150° path is active. After the signal from the longer path reaches second transducer 7, the signals from the two paths interfere with each other. Therefore, measurement of the amplitude attenuation takes place only during the interval of time while the 150° is active but before the 210° path is active. Attenuation of the signal is a clear indication of the presence of liquid in the tube.

The 150° angle of displacement between the sending and receiving transducer is not crucial but represents a trade off between sensing the maximum length of circumference in one direction while being able to differentiate between signals propagating around the tube in both directions. It can be appreciated that the further the second transducer 7 is placed from the first transducer 3 (i.e., closer to 180° around tube 1), the more circumference of the tube wall can be sensed by a signal for the presence of liquid. However, as the second transducer is located closer to 180° around tube 1, the interval of time during which only the signal propagating around the shorter path is being received is also correspondingly shorter. Therefore, a displacement of 150° is chosen to provide a high degree of sensitivity to liquid while maintaining a time interval of measurement long enough to clearly distinguish attenuation of the signal.

In the preferred embodiment, the outer diameter of tube 1 ranges from approximately 0.5 to 0.75 inches and the tube wall thickness varies from approximately 0.049 to 0.056 inches. First and second transducers 3 and 7 can be piezoelectric crystals, such as PZT5A material manufactured by the Clevite Corporation and cut into chips 0.035 by 0.050 by 0.20 inches in size.

In the preferred embodiment, a pulse generator 5 sends a signal containing pulses $0.5\times10^{-6}$ seconds wide at a repetition rate of $10^3$ pulses/second. The pulses propagate in the tube at a rate of approximately $1\times10^4$ feet/second. The pulse time delay gate measurement means 9 measures the wave of pulses from the shorter path only. Attenuation of approximately 50% indicates presence of liquid in the tube at the specific location along the tube where the transducers are connected.

In the preferred embodiment, the sending transducer 3 sends a signal that has an amplitude of approximately 10 volts. If liquid is not present in the tube at that location, the receiving transducer 7 will record an amplitude measurement of approximately 10 volts. On the other hand, if liquid is present in the line at that location, the receiving transducer 7 will record an amplitude measurement of approximately 5 volts. The amplitude of the received signal can vary to a small degree from unit to unit. However, the attenuation of the signal is independent of the pulse amplitude and is consistently in the range of 50% indicating the presence of liquid in the pipe. For example, if the sending transducer sends a signal of 6 volts, the receiving transducer will record an amplitude measurement of 3 volts if liquid is present.

This invention has the further advantage of not only testing for liquid in the line, but also providing a self-test for system failure. With the present invention, the only safe condition is when the receiving transducer records a voltage amplitude approximately equal to the voltage of the sending transducer. If there is a failure in the system (i.e., the receiving transducer becomes unattached) the receiving transducer will measure 0 volts, thereby indicating inspection and repair is required.

Thus, any condition other than all safe can be easily determined.

Figure 2:
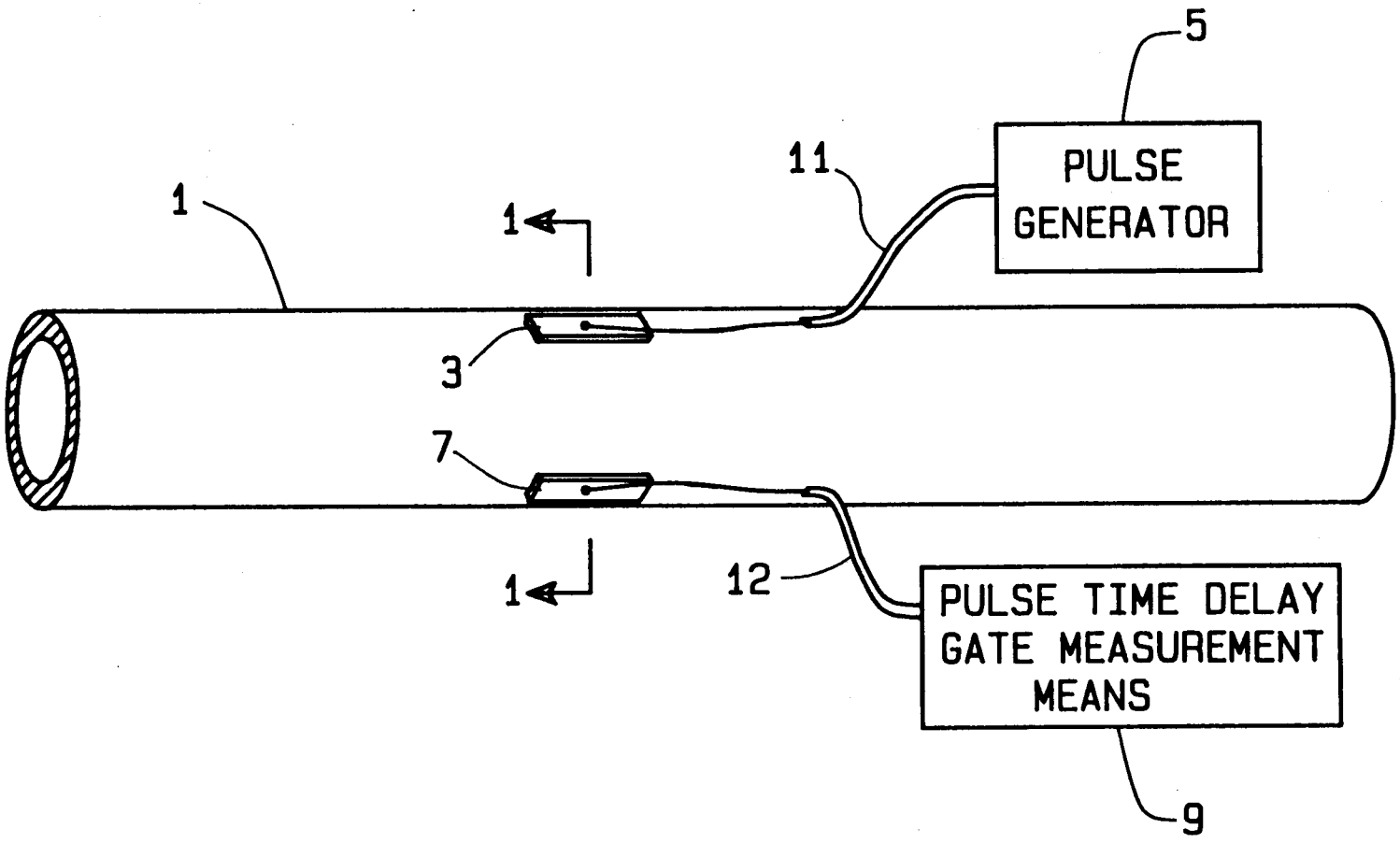
FIG. 2 is a side view of a section of tube illustrating attachment of the present invention.

FIG. 2 illustrates the connection of first and second transducers 3 and 7 to tube 1 with leads 11 and 12 for connecting to the pulse generator 5 and pulse time delay gate measurement means 9, respectively, which may be located at a remote location. Thus, pulse generator 5 and pulse time delay gate measurement means 9 can be easily disconnected and used elsewhere. Alternatively, switching means may be employed to connect a pulse generator and pulse time delay gate measurement means to several different sending and receiving transducers at different locations on tubes through a plant.

The embodiment of the invention in which an exclusive property or privilege is claimed is defined as follows:

1. An apparatus for detecting the presence of liquid in a tube comprising:

a sending transducer in direct contact with said tube, a receiving transducer in direct contact with said tube at the same location along said tube as said sending transducer but circumferentially displaced from said sending transducer by an angle less than 180°, means for sending an ultrasonic pulse from said sending transducer, means for selectively measuring the amplitude of an ultrasonic pulse received by said receiving transducer, said selective measuring means operably capable of selectively measuring the amplitude of an ultrasonic pulse during a time period that includes the time period after which an ultrasonic pulse arrives at said selective measuring means by a path through the tube less than 180° and ends before an ultrasonic pulse arrives at said selective measuring means through the tube by a path through the tube greater than 180°, whereby the presence of liquid in the tube can be detected by the attenuation of a pulse sent by said sending transducer and received by said receiving transducer.

2. The apparatus of claim 1 in which said means for sending a pulse comprises:

means for sending an approximately 0.5 microsecond pulse at a 1,000 pulse per second repetition rate.

3. The apparatus of claim 2 in which the tube has an outer diameter between approximately 0.5 and 0.75 inches.

4. The apparatus of claim 3 in which the sending transducer is a piezoelectric crystal.

5. The apparatus of claim 4 in which the receiving transducer is a piezoelectric crystal.

6. The apparatus of claim 5 in which the tube has a wall thickness in the range of approximately 0.049 to 0.056 inches.

7. The apparatus of claim 1 in which said receiving transducer is displaced approximately 150° around the tube from said sending trasnsducer.

* * * * *